United States Patent [19]

Cooper

[11] Patent Number: 5,273,772

[45] Date of Patent: Dec. 28, 1993

[54] FOOD COMPOSITIONS CONTAINING ESTERIFIED ALKOXYLATED POLYSACCHARIDE FAT SUBSTITUTES

[75] Inventor: Charles F. Cooper, Paoli, Pa.

[73] Assignee: Arco Chemical Technology, L.P., Wilmington, Del.

[21] Appl. No.: 782,698

[22] Filed: Oct. 25, 1991

[51] Int. Cl.$^5$ .............................. A23D 7/00
[52] U.S. Cl. .................. 426/611; 426/804; 554/168
[58] Field of Search ............... 426/601, 611, 531, 804

[56] References Cited

U.S. PATENT DOCUMENTS 4,861,613  8/1989  White et al. .................. 426/611

OTHER PUBLICATIONS

Booth et al. "Caloric Availability and Digestibility of New-Type Fats" J. of the American Oil Chemists Society vol. 40 Oct. 1963 pp. 551–553.

[Gros et al., *J. Am. Oil Chem. Soc.* 30, 19–24 (1962)].

*Primary Examiner*—Carolyn Paden
*Attorney, Agent, or Firm*—Stephen D. Harper

[57] ABSTRACT

Reduced calorie food compositions containing digestion-resistant esterified alkoxylated polysaccharides as full or partial replacements for conventional triglyceride lipids are described. In one embodiment, a polysaccharide such as starch or cellulose is reacted with propylene oxide and the resulting propoxylated polysaccharide then esterified using one or more fatty acids or fatty acid derivatives.

25 Claims, No Drawings

FOOD COMPOSITIONS CONTAINING ESTERIFIED ALKOXYLATED POLYSACCHARIDE FAT SUBSTITUTES

This invention relates to reduced calorie food compositions containing esterified alkoxylated polysaccharides. The esterified alkoxylated polysaccharides have fat-like physical and organoleptic properties and are employed as full or partial replacements for conventional edible triglyceride lipids. The invention also pertains to methods for reducing the available caloric content of food compositions normally containing a digestible fat or oil, wherein an esterified alkoxylated polysaccharide resistant to digestion is substituted for at least a portion of the fat or oil.

BACKGROUND OF THE INVENTION

The accumulation of medical evidence in recent years regarding the adverse health implications of high fat diets, principally heart attacks, arteriosclerosis and obesity, has caused consumers to become extremely concerned about their diets. It is estimated that between 70–80% of U.S. adult females follow a weight reducing diet at least once a year. Men are also concerned about their weight and cholesterol levels.

Common obesity is currently one of the most prevalent metabolic problems in the general population. Fats and oils are necessary for balanced nutrition. However, the average consumer simply consumes more than is needed for proper nutrition. It is estimated that lipids constitute about 40% of the total calories in the typical western diet. Fats are consumed directly in meats, spreads, salad oils, and in natural produce such as nuts and avocados. Fats and oils are also consumed as a result of absorption or incorporation in foods during baking and frying. The sharp increase in consumption of fast foods is a major contributor to the increase in the amount of dietary fat since fast foods rely extensively on frying processes employing fats and oils. In addition, the snack food industry uses large amounts of fats and oils in the production of potato chips, corn chips and other snack items.

It is clear that there is an enormous potential market for a fat substitute or fat mimetic that is substantially non-digestible or has reduced caloric value. Replacement of fats in the diet with non-caloric substitutes is a more efficient way of reducing caloric intake than replacing sugar or carbohydrates because, gram for gram, the substitution of non-caloric fat substitutes is more than twice as effective as reducing carbohydrate content with substances such as saccharine or aspartame.

One of the difficulties in eliminating fat from the diet is the fact that fats and oils are all-pervasive in food products. In part, this is because they play an important role in the organoleptic acceptability of food products. In addition to imparting flavor, palatability, and creaminess to foods, lipids provide an essential lubricating action.

Generally speaking, a fat substitute providing fewer calories than a conventional triglyceride must be more resistant towards metabolic energy-releasing processes such as disassimulation and catabolism wherein the fat substitute is broken down into simpler substances.

In addition, the fat substitute must be non-toxic at high levels of ingestion. It must contain no toxic residues or impurities. To the extent that a fat substitute may be partially digested upon consumption, any digestion products must themselves to non-toxic. In general, fat substitutes must be without any serious physiological side effects.

A fat substitute must also have good organoleptic qualities of mouth feel and aroma and must not unacceptably alter the taste of a food composition. In addition, fat substitutes must have appropriate physical properties for use in food compositions. For example, they should be liquids or low-melting solids depending on whether they are to be used as oil or shortening substitutes. The ideal fat substitute will also provide the bulk and volume normally associated with an edible lipid.

For a fat mimetic to be widely useful as a direct replacement for a conventional triglyceride, it must also have a high degree of stability at the elevated temperatures normally employed in the preparation of certain fat-containing food compositions. That is, the physical properties and chemical composition of the fat substitute must not be irreversibly and detrimentally altered by exposure to high temperature when used for frying, cooking, baking, and the like. The ideal fat mimetic will additionally be resistant to oxidative and thermal degradation at such temperatures so that it does not discolor, develop off-flavors or unacceptable aroma, generate volatile decomposition products, smoke, or produce toxic by-products.

Many different types of substances have been proposed for use as fat substitutes in food compositions. For example, U.S. Pat. No. 4,861,613 describes esterified epoxide-extended polyols derived from fatty acids, $C_3$–$C_6$ epoxides such as propylene oxide, and low molecular weight polyols containing three or more hydroxy groups such as glycerin, sugars, and sugar alcohols. While such substances have been generally found to have wide utility as fat replacements, a diet which contains a high proportion of certain of these esterified epoxide-extended polyols can result in problems with anal leakage or diarrhea due to the pronounced resistance of these compounds towards digestion and adsorption.

A number of polysaccharides or modified polysaccharides have also been suggested for use as fat replacements in foods. For example, an aqueous slurry of a modified food starch produced by a controlled acid treatment of corn starch may be shear processed under high pressure homogenization conditions to yield a smooth cream. The cream can reproduce the mouth feel and texture of fat in a variety of food applications (*Food Technology*, August 1991, p. 262). Another example of a fat-replacing ingredient which is also available commercially is manufactured by touch hydrolysis of rice starch using alpha amylase (*Food Technology*, August 1991, p. 264). This ingredient can be employed as an aqueous gel or in dry (powder) form. However, many of the polysaccharide-based fat substitutes suffer from one or more pronounced disadvantages which limit their usefulness in the preparation of reduced-fat food compositions. A major limitation is that such substances are generally not useable as fat replacements where the food is exposed to temperatures higher than those normally encountered during baking. Additionally, such substances are non-melting solids or powders and thus cannot be substituted for a conventional liquid or low-melting triglyceride in a frying application. Another drawback which has been noted is that since these polysaccharides require water to simulate the mouth feel and texture of fat, baked goods, frostings, and the like have a tendency to dry out, harden, or become stale fairly rapidly as the water migrates out of the food product. Yet another recognized disadvantage of certain polysaccharide food components is that ingestion of such substances in amounts as low as 30 to 100 grams per day can cause some persons to suffer from gastrointestinal discomfort and diarrhea.

SUMMARY OF THE INVENTION

An object of the present invention is to provide food compositions containing polysaccharide-based fat replacement or mimetic compounds which are simultaneously substantially resistant to digestion and adsorption, similar in physical and organoleptic properties to conventional triglyceride lipids, stable at high cooking temperatures, non-toxic, easily prepared at low cost from readily available starting materials, lower in caloric availability than fats and oils derived from natural sources, adaptable to a wide variety of end-use applications, and which have a reduced tendency to cause problems with anal leakage or other laxative side effects as compared with known fat substitutes. Moreover, the fat mimetics of this invention do not require the presence of water to impart a fat-like texture, consistency, or mouth feel to food compositions. As a result, food compositions containing such fat replacements do not harden or become stale as quickly as certain of the previously known polysaccharide-based fat replacements.

This invention thus provides a reduced calorie food composition comprising at least one non-fat foodstuff ingredient and a fat-type component wherein at least a portion of the fat-type component is an esterified alkoxylated polysaccharide having at least 10 anhydromonosaccharide units, a plurality of oxyalkylene units derived from at least one $C_2$-$C_{10}$ epoxide covalently bonded to the anhydromonosaccharide units through ether linkages, and a plurality of acyl groups derived from at least one $C_8$-$C_{24}$ fatty acid covalently bonded to the oxyalkylene units through ester linkages.

Also provided is a reduced calorie food composition comprising at least one non-fat foodstuff ingredient and a fat-type component wherein at least a portion of the fat-type component is an esterified alkoxylated polysaccharide having at least 10 anhydromonosaccharide units, wherein the majority of the anhydromonosaccharide units each have attached thereto through an ether linkage from 1 to 3 pendent polyoxyalkylene segments having the structure

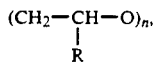

wherein n is an integer of from 1 to 20 and R is a $C_1$-$C_6$ alkyl group, and wherein the majority of the polyoxyalkylene segments are attached through an ester linkage to an acyl group derived from a $C_8$-$C_{24}$ fatty acid.

The invention additionally provides a reduced calorie food composition comprising at least one non-fat foodstuff ingredient and a fat-type component wherein at least a portion of the fat-type component is an esterified alkoxylated polysaccharide having at least 10 anhydromonosaccharide units having oxyalkylene groups derived from at least one $C_3$-$C_{10}$ epoxide pendent thereto, an average degree of alkoxylation of at least about 5, and an average degree of esterification of at least 1.5 wherein the ester groups are derived from at least one $C_8$-$C_{24}$ fatty acid.

Still another embodiment of this invention provides a reduced calorie food composition comprising at least one non-fat foodstuff ingredient and a fat-type component wherein at least about 10 weight percent of the fat-type component is an esterified propoxylated polysaccharide comprised of n structural repeating units of the general formula

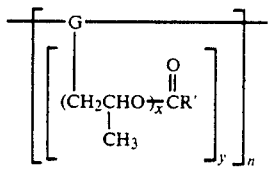

wherein n is at least 10, G is an anhydroglucose unit, x is from 2 to 20, y is an integer of from 1 to 3, and

is an acyl group derived from a $C_8$-$C_{24}$ fatty acid.

Also provided is a reduced calorie food composition comprising at least one non-fat foodstuff ingredient and a fat-type component wherein at least a portion of the fat-type component is an esterified alkoxylated polysaccharide comprising the reaction product obtained by alkoxylating a polysaccharide having at least 10 anhydromonosaccharide units with at least one $C_2$-$C_{10}$ epoxide to form an alkoxylated polysaccharide and esterifying the alkoxylated polysaccharide with at least one $C_8$-$C_{24}$ fatty acid or fatty acid equivalent.

The invention additionally provides a reduced calorie food composition comprising at least one non-fat foodstuff ingredient and a fat-type component wherein at least about 10 weight percent of the fat-type component is an esterified propoxylated polysaccharide comprising the reaction product obtained by propoxylating a polysaccharide having at least 10 anhydroglucose units with from 5 to 60 equivalents of propylene oxide per anhydroglucose unit to form a propoxylated polysaccharide and esterifying the propoxylated polysaccharide with from 0.5 to 3 equivalents of at least one $C_8$-$C_{24}$ fatty acid or fatty acid equivalent per anhydroglucose unit.

Another aspect of the invention provides a fat-like composition suitable for use in the preparation of a reduced calorie food composition wherein said fat-like composition is comprised of an edible fatty acid triglyceride and an esterified alkoxylated polysaccharide of the type herein described.

The invention also provides a method of reducing the available caloric content of a food composition comprised of a conventional edible fatty acid triglyceride, said method comprising replacing at least a portion of the triglyceride with an esterified alkoxylated polysaccharide of the type herein described.

DETAILED DESCRIPTION OF THE INVENTION

The esterified alkoxylated polysaccharides useful as reduced calorie fat substitutes in the food compositions of this invention contain at least 10 anhydromonosaccharide units, a plurality of oxyalkylene units (that is, more than 1 oxyalkylene unit) derived from at least one $C_2$–$C_{10}$ epoxide covalently bonded to the anhydromonosaccharide units, and a plurality of acyl groups derived from at least one $C_8$–$C_{24}$ fatty acid covalently bonded to the oxyalkylene units. Preferably, the number of oxyalkylene units is at least equal to the number of anhydromonosaccharide units. More preferably, the number of oxyalkylene units is at least five times the number of anhydromonosaccharide units. The number of acyl groups is preferably at least equal to the number of anhydromonosaccharide units. Thus, in a preferred embodiment of this invention, the esterified alkoxylated polysaccharide contains X anhydromonosaccharide units, X (more preferably 5X) oxyalkylene units, and X acyl groups, wherein X is at least 10.

The number of anhydromonosaccharide units may be varied as desired in order to control the physical properties and performance of these substances. Generally speaking, for example, the viscosity and melting or softening point of the esterified alkoxylated polysaccharide will tend to increase as the degree of polymerization of the polysaccharide backbone is increased. However, as will become apparent from the subsequent discussion, the characteristics of the fat substitutes are also influenced by other structural factors. As a practical matter, it will usually be preferable to have the number of anhydromonosaccharide units be no more than about 10,000. In a preferred embodiment of this invention, the number of such units is from about 12 to 62. In another preferred embodiment, however, the esterified alkoxylated polysaccharide contains from about 300 to 1250 anhydromonosaccharide units.

Without wishing to be bound by theory, it is believed that the low caloric availability of the esterified alkoxylated polysaccharides is attributable at least in part to the relatively high molecular weight of these substances. The typical molecular weights of the fat mimetics of this invention are much higher than those of other fat mimetics such as sucrose polyester or esterified propoxylated glycerin. As a result, a very low degree of direct absorption through the digestion tract wall can occur. Moreover, even if partial digestion does take place, the resulting digestive products are likely to still be too high in molecular weight to be readily absorbed.

The anhydromonosaccharide moieties occur as repeating units in the esterified alkoxylated polysaccharide; that is, they are covalently linked to each other through acetal oxygen bridges. The polysaccharide portion of the molecule may be linear (wherein each monosaccharide unit is connected to no more than 2 other units) or branched (wherein certain of the monosaccharide units are connected to more than 2 other units).

The polysaccharide "backbone" of the fat mimetics of this invention is also thought to be responsible for the reduced tendency of these substances to cause problems with anal leakage or diarrhea. The high molecular weight of the polysaccharide backbone tends to produce a thickening or gellation effect. In addition, since the polysaccharide is somewhat hydrophilic in character, while the fatty acid ester groups are hydrophobic, the overall molecule is able to act as an emulsifier and compatibilize or stabilize oil/water mixtures. That is, the polysaccharide portion of the molecule tends to associate with water while the fatty acid ester portion tends to associate with oil, making the fat mimetic less likely to separate from the digested food stream present in the digestive tract.

The anhydromonosaccharide units may be derived from one or more different types of monosaccharides capable of forming a cyclic hemiacetal or hemiketal type structure such as for example, ribose, arabinose, xylose, lyxose, allose, altrose, glucose, manrose, gulose, idose, galactose, talose, fructose, and the like as well as related compounds such as glucosamine, galactosamine, glucuronic acid, as well as other uronic acids and amino-sugars. Preferably, the anhydromonosaccharide units are predominantly anhydroglucose units. In one particularly preferred embodiment of the invention, at least about 75% (more preferably, at least about 90%) of the anhydromonosaccharide units in the esterified alkoxylated polysaccharide are anhydroglucose units. The general structure of an anhydroglucose unit is as follows:

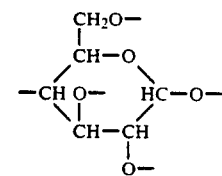

wherein the $CH_2O$— groups are attached to hydrogen, oxyalkylene units, or acyl groups.

The properties and relative digestibility of the fat mimetics of this invention can be altered as desired by changing the orientation of the oxygen bridges linking the anhydromonosaccharide units. For example, where the linkages are beta-oriented, as in a cellulose-type polysaccharide, the polysaccharide backbone will be highly resistant towards hydrolysis upon ingestion since humans and other carnivores lack the specific enzymes necessary to catalyze the hydrolysis of anhydroglucose units linked in this fashion. This resistance to hydrolysis will decrease the available caloric content of an esterified alkoxylated polysaccharide containing predominantly beta linkages as compared to an analogous esterified alkoxylated polysaccharide containing predominantly alpha linkages. Alpha linkages, as are present in polysaccharides such as starch, are normally readily hydrolyzed by the digestive enzymes present in humans. Owing to the bulky and hydrophobic oxyalkylene and fatty acid ester groups substituted on the anhydromonosaccharide units of the fat mimetics of this invention, however, even esterified alkoxylated polysaccharides containing alpha linkages will be more resistant to enzymatic degradation upon consumption than the base polysaccharides. At the same time, such fat mimetics may still be digestible to an extent such that anal leakage problems are minimized. Moreover, the esterified alkoxylated polysaccharides of this invention will be ultimately biodegradable regardless of whether alpha or beta linkages are present, since many microorganisms and ruminants (cud-chewing animals) possess enzymes capable of readily hydrolyzing the beta linkages of a polysaccharide such as cellulose. Thus, disposal of waste products containing the esterified alkoxylated polysaccharides, whether through existing sewage treatment facilities or by incorporation of the waste material in cattle feed, will not be a serious problem.

The oxyalkylene units are derived from one or more relatively low molecular weight epoxides, especially $C_3$–$C_{10}$ epoxides. Each oxyalkylene unit has the general skeletal formula

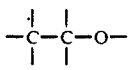

containing two carbons and one oxygen. However, the oxyalkylene unit may be substituted with an alkyl, aryl, aralkyl, or other such substituent. In a preferred embodiment, the oxyalkylene units correspond to the structure

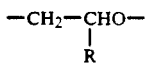

wherein R is a $C_1$-$C_6$ alkyl group such as methyl, ethyl, propyl, isopropyl, butyl, sec-butyl, iso-butyl, tert-butyl, pentyl, hexyl, cyclohexyl, and the like. Most preferably, R is methyl. The oxyalkylene units may be derived from epoxides such as ethylene oxide, propylene oxide, 1,2-butene oxide, 2,3-butene oxide (cis or trans), isobutylene oxide, 1,2-pentene oxide, cyclohexene oxide, phenyl glycidyl ether, methyl glycidyl ether, ethyl glycidyl ether, styrene oxide, 2,3-pentene oxide, cyclopentene oxide, 1,2-hexene oxide, and the like. While propylene oxide is the preferred epoxide owing to its reactivity, low cost, and favorable influence on the ultimate properties of the esterified alkoxylated polysaccharide, mixtures of epoxides may be employed.

While the oxyalkylene units may be oxyethylene (i.e., derived from ethylene oxide), it is preferred that not more than 50 mole % of the oxyalkylene units are oxyethylene since oxyethylene units tend to increase the hydrophilicity of the molecule and thus may tend to detract from the desired fat-like properties of the fat substitute. Moreover, if maximum resistance to enzyme-catalyzed hydrolysis is desired, it will be advantageous to employ a substituted oxyalkylene unit rather than oxyethylene as the terminal oxyalkylene unit (i.e., the oxyalkylene unit furthest away from the anhydromonosaccharide unit) such that the ester linkage to the acyl group

is secondary or tertiary rather than primary. The presence of an alkyl group such as methyl or ethyl alpha to the ester linkage apparently introduces sufficient steric hindrance so as to significantly decrease the rate of hydrolysis upon ingestion. For these reasons, less than about 20%, and more preferably less than about 5%, of the ester linkages in the esterified alkoxylated polysaccharide should be primary.

However, the chemical structure of the esterified alkoxylated polysaccharide may be selected such that the ester linkages are predominantly (>50%) primary and thus more susceptible to enzymatic hydrolysis. This type of configuration will be advantageous where an even further reduction in anal leakage is desired. That is, the esterified alkoxylated polysaccharide would have oil-like properties initially, but upon ingestion will undergo hydrolysis to some extent to yield free fatty acid and alkoxylated polysaccharide. The fatty acid will be metabolized in the same fashion as the fatty acid derived upon ingestion of a conventional triglyceride oil. The alkoxylated polysaccharide will be resistant to further digestion and yet, because of the loss of the long chain hydrophobic fatty acid groups and the generation of free hydroxyl groups, be considerably less oily and thus more compatible with the other food substances present in the digestive tract. The alkoxylated polysaccharide generated will thus be less likely to act as a lubricant or laxative than an esterified alkoxylated polysaccharide lacking such readily hydrolyzable primary ester linkages.

In one embodiment of this invention, blocks of oxyethylene units may be incorporated in the esterified alkoxylated polysaccharide such that one end of each block is attached to a anhydromonosaccharide moiety while the other end is attached to oxyalkylene units other than oxyethylene so as to provide secondary or tertiary ester linkages. The oxyethylene blocks adjacent to the polysaccharide backbone will tend to enhance the hydrophilic character of the backbone and thus improve the ability of the esterified alkoxylated polysaccharide to emulsify, gel, or thicken upon contact with water, thus further reducing anal leakage problems.

The physical properties and other characteristics of the esterified alkoxylated polysaccharides may be adapted as desired for particular end-use applications by changing not only the structure of the oxyalkylene units but also the number of such units in the compound. Preferably, however, the anhydromonosaccharide units will have an average degree of alkoxylation of from 1 to 60. More preferably, the average degree of alkoxylation will be at least about 5. That is, on average, each anhydromonosaccharide unit will have linked to it, either directly through an oxygen (ether) bond or indirectly through intervening oxyalkylene units, from 1 to 60 oxyalkylene units. In this context, "average degree of alkoxylation" corresponds in meaning to the term "molar substitution," which is commonly employed in the art to describe the number of epoxide molecules which have been reacted with a polysaccharide. For example, an esterified alkoxylated polysaccharide containing 100 anhydromonosaccharide units and a total of 500 oxyalkylene units will have an average degree of alkoxylation of 5. The melting or softening point of the initial polysaccharide is generally decreased and the "plasticity" or flowability increased by increasing the average degree of alkoxylation. Thus, it is possible to convert a normally solid or high melting polysaccharide into a liquid, low melting, or "plastic" esterified alkoxylated polysaccharide by incorporating a sufficiently high number of oxyalkylene units into the compound, especially where the oxyalkylene unit is an unsymmetrically substituted oxyalkylene such as oxypropylene or oxybutylene. To be directly substitutable for a conventional triglyceride lipid in a food composition, the physical properties of the esterified alkoxylated polysaccharide (liquid/solid stability, softening point, viscosity, yield point, thixotropic area, and so forth) should mimic the triglyceride properties as much as possible.

In a preferred embodiment, the majority (i.e., at least 50%) of the anhydromonosaccharide units in the esterified alkoxylated polysaccharide each have attached thereto from 1 to 3 pendent polyoxyalkylene segments, each polyoxyalkylene segment containing from 1 to 20 oxyalkylene units (more preferably, from 2 to 20) as herein described. The carbon end of the polyoxyalkylene segment

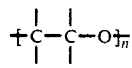

(preferably, n=1-20; more preferably n=2-20) is attached to an anhydromonosaccharide unit through an oxygen (ether) linkage while the oxygen end is normally attached to an acyl group

through an ester linkage. However, since not all of the polyoxyalkylene segments need be esterified, some of the segments may be attached to a hydrogen such that an alcohol group is present at the oxygen end.

The acyl groups covalently bonded to the oxyalkylene units may be derived from one or more $C_8$-$C_{24}$ fatty acids. "Derived" in this context means that the acyl group has a long chain hydrocarbyl structure analogous to that of a fatty acid. As will be explained in more detail subsequently, the esterified alkoxylated polysaccharide may actually be prepared using either a fatty acid or a fatty acid derivative such as a fatty acid ester, fatty acid halide, or fatty acid anhydride. Examples of suitable fatty acids include, but are not limited to, caprylic, capric, lauric, myristic, myristoleic, stearic, palmitic, palmitoleic, rincinoleic, linolenic, linoleic, elaeostearic, arachidic, arachidonic, behenic, erucic, oleic, heptadeconoic, as well as mixtures thereof such as those normally obtained from natural sources such as triglycerides. The fatty acid may be saturated or unsaturated, but preferably has a monocarboxylate structure (i.e., only 1 carboxylic acid functionality is present) Thus,

may be a $C_7$-$C_{23}$ olefinic or paraffinic hydrocarbon radical.

The properties of the esterified alkoxylated polysaccharide may be modified as desired by changing the type of fatty acid used as well as the degree of esterification. For example, the use of long chain (i.e., higher than 16 carbon atoms) saturated fatty acids will generally tend to increase the melting or softening point of the fat mimetic. Thus, the esterified alkoxylated polysaccharide may be either a solid wax or paste (as would be desirable for a shortening or margarine type product) or a liquid (as would be desirable for a salad or cooking oil) at room temperature.

Preferably, at least a majority (50%) of the polyoxyalkylene segments in the compound are esterified with an acyl group, as the overall hydrophobicity (lipophilicity) of the esterified alkoxylated polysaccharide tends to increase as the extent of esterification is increased. For this reason, it is desirable that the anhydromonosaccharide units have an average degree of esterification of at least 0.5. Fully esterified fat mimetics are also possible. For example, where the anhydromonosaccharide unit is anhydroglucose, the average degree of esterification can be as high as 3, since up to 3 hydroxyl groups per anhydroglucose unit will be available for esterification. That is, each anhydromonosaccharide unit has associated with it from 0.5 to 3 acyl groups, on average. Most preferably, the average degree of esterification will be at least 1.5. The acyl groups will, for the most part, be attached to the anhydromonosaccharide units through the polyoxyalkylene segments. However, if the degree of alkoxylation is sufficiently low such that a portion of the initial hydroxyl groups of the polysaccharide remain unreacted (i.e., unalkoxylated), some of the acyl groups may be connected directly to the anhydromonosaccharide unit. It is preferred that at least half of the acyl groups are attached to the oxygen end of a polyoxyalkylene segment.

In one embodiment of this invention, the esterified alkoxylated polysaccharide is comprised of n structural repeating units of the general formula

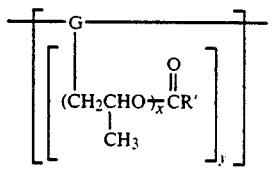

wherein n is at least 10, G is an anhydroglucose unit, x is from 2 to 20, y is an integer of from 1 to 3, and

is an acyl group derived from a $C_8$-$C_{24}$ fatty acid. Depending on the value of y, the anhydroglucose unit may also have attached thereto other functional groups such as hydroxyl, ester, or hydroxyl-terminated oxypropylene segments.

Preferably, the structure of the esterified alkoxylated fat mimetic of this invention is selected such that the in vitro lipase hydrolysis rate using porcine pancreatic lipase is less than about 20% of the rate of an olive oil standard. To achieve the maximum possible caloric reduction, the lipase hydrolysis rate is less than about 10% of the olive oil rate. The experimental procedure for determining the in vitro lipase hydrolysis rate is described in U.S. Pat. No. 4,861,613, the teachings of which are incorporated herein by reference in their entirety.

Any suitable method may be employed to prepare the esterified alkoxylated polysaccharides of this invention. Such methods are well known and are described, for example, in U.S. Pat. No. 3,824,085 (Teng et al.), incorporated herein by reference in its entirety.

Generally speaking, the esterified alkoxylated polysaccharides useful as fat substitutes can be prepared by alkoxylating a polysaccharide having at least 10 anhydromonosaccharide units with at least one $C_2$-$C_{10}$ epoxide to form an alkoxylated polysaccharide and then esterifying the alkoxylated polysaccharide with at least one $C_8$-$C_{24}$ fatty acid or fatty acid equivalent. The initial polysaccharide may be any of the natural or synthetic saccharide polymers such as starch, amylose, amylopectin, cellulose, chitin, glycogen, fructan, hemicellulose, inulin, xylan, mannan, xanthan gum, arabinogalactan, carrageenan, maltodextrin, gum arabic, dextrin, or the like. Polydextrose is an example of a synthetic saccharide polymer suitable for use in the preparation of the esterified alkoxylated polysaccharides of this invention. Polydextrose is manufactured by a condensation melt polymerization of D-glucose, sorbitol, and citic acid (to provide diester crosslinks) and has a molecular weight of from about 160–22,000. Partially hydrolyzed polysaccharides are preferred for use, as such materials will tend to contain a relatively smaller number of repeating anhydromonosaccharide units. Hydrolyzates of polysaccharides are well-known. Cellulose hydrolyzates are described, for example, in Sharples, "Degradation of Cellulose and its Derivatives," in *Cellulose and Cellulose Derivatives*, Bikales et al., Ed., Part V, Chapter XVII, p. 991, Wiley-Interscience (1971). Starch hydrolyzates (also known as acid modified starches) are described, for example, in Wurzberg, "Converted Starches," in *Modified Starches:Properties and Uses*, Chapter 2, p. 18, CRC Press (1986) and Shildneck et al., "Production and Uses of Acid-Modified Starches," in *Starch:Chemistry and Technology*, Vol. II, Chapter IX, p. 217, Academic Press (1967). The teachings of these publications are incorporated herein by reference in their entirety. In a preferred embodiment of the invention, a high fluidity starch is employed having a fluidity of 60 or higher (see the Wurzberg reference, p. 20, for a description of the method by which fluidity is measured). Water, polyether polyols, and/or mono-di, or oligosaccharides may be present together with the polysaccharide without harmful effect, since the subsequent alkoxylation and esterification steps will convert these species into esterified polyethers of the type taught to be useful in their own right as reduced calorie fat substitutes in U.S. Pat. Nos. 4,861,613 and 4,949,242.

The source of the polysaccharide is not critical. For example, starches derived from corn, rice, potato, wheat, tapioca, sago, and grain sorghum sources may be suitably employed. Potential sources of cellulose include wood pulp, cotton linters, chemical cotton, and the like.

Methods of alkoxylating polysaccharides by reacting with an epoxide or a mixture of epoxides are well-known in the art. For example, the preparation of alkoxylated starch is described in U.S. Pat. No. 4,585,858 while processes for producing oxyalkylene derivatives of cellulose are disclosed in U.S. Pat. No. 3,336,291. The teachings of both these patents are incorporated herein by reference in their entirety.

The polysaccharide is reacted with the desired number of equivalents of epoxide (typically, from 1 to 60 equivalents of epoxide per anhydromonosaccharide unit; more preferably, at least about 5 equivalents of epoxide). It is particularly desirable to carry out the alkoxylation under base-catalyzed conditions when using a substituted epoxide such that the epoxide ring-opens to form a secondary or tertiary hydroxyl endgroup on the polyoxyalkylene segment. As explained previously, this structural feature renders the resulting ester linkage to the acyl group more resistant towards enzymatic hydrolysis upon ingestion. Additionally, it is desirable to employ a sufficient quantity of epoxide so as to obtain the alkoxylated polysaccharide in liquid or paste form as compared to the initial unreacted polysaccharide, which normally is in a solid or particulate state.

The alkoxylated polysaccharide may then be esterified with a fatty acid or fatty acid derivative using any of the known methods for converting a hydroxyl functionality to an ester group. The fatty acid compound may preferably be a fatty acid or fatty acid ester having the general structure

wherein R is a $C_8$–$C_{23}$ olefinic or paraffinic hydrocarbon radical and R' is hydrogen or a $C_1$–$C_6$ hydrocarbon radical. Monocarboxylic acids or derivatives are preferred for use. Examples of suitable fatty acids include, but are not limited to, caprylic, capric, lauric, myristic, myristoleic, stearic, palmitic, palmitoleic, rincinoleic, linoleic, linolenic, elaeostearic, arachidic, arachidonic, behenic, erucic, oleic, and heptadecanoic acid. The fatty acids may be derived synthetically or from natural sources such as triglyceride lipids. Exemplary fatty acid esters include the methyl, ethyl, propyl, and isopropyl esters of the foregoing fatty acids.

Fatty acid halides may also be used in the esterification process. Such fatty acid halides can have the general structure

wherein R is a $C_8$–$C_{23}$ olefinic or paraffinic hydrocarbon radical and X is halide, preferably chloride or bromide. Mixtures of fatty acid compounds, such as the mixtures of fatty acids typically obtained by hydrolysis of a triglyceride such as corn oil or soybean oil, may be used.

The alkoxylated polysaccharide and the fatty acid compound are reacted for a time and at a temperature sufficient to accomplish the desired degree of esterification of the hydroxyl groups of the alkoxylated polysaccharide. The optimum reaction conditions will vary somewhat depending upon the particular type of fatty acid compound used. If a fatty acid or fatty acid ester is utilized, the reaction temperature is preferably from about 100° C. to 350° C.; reaction times of from about 1 to 48 hours are generally sufficient to accomplish esterification of the hydroxyl groups. A co-product having the structure HOR, will be generated as the esterification proceeds. To drive the reaction to completion, it is desirable to remove the co-product from the reaction mixture as it forms by a suitable method such as distillation or vacuum stripping. A catalyst may be employed if desired to shorten the reaction time required. If the fatty acid moiety is a free fatty acid, the catalyst is preferably an acidic catalyst. If a fatty acid ester is used, an acidic or basic catalyst may be present during esterification. When the fatty acid moiety is a fatty acid halide, somewhat lower reaction temperatures (e.g., about 25° C. to 125° C.) are sufficient, particularly if a tertiary amine such as triethylamine is additionally present to take up the HX generated during the esterification reaction. Reaction times of from about 1 to 48 hours are typically sufficient.

The esterified alkoxylated polysaccharides of this invention may be used as a partial or total replacement for a conventional lipid in any edible fat-containing food composition. The amount of the fat mimetic is sufficient to effectively reduce the available calories of the food composition compared to a food composition prepared using an equivalent amount of a conventional fully digestible triglyceride lipid alone. Preferably, at least about 10 percent (more preferably, at least about 25 percent) of the edible oil component of the composition is comprised of the esterified alkoxylated polysaccharide.

The triglyceride lipid admixed with the esterified alkoxylated polysaccharide may be any of the known edible fatty acid triglycerides available from natural or synthetic sources. These edible fatty acid triglycerides include, but are not limited to, tallow, soybean oil, cottonseed oil, coconut oil, palm kernel oil, corn oil, fish oil, lard, butterfat, olive oil, palm oil, peanut oil, safflower seed oil, cocoa butter, sesame seed oil, ropeseed oil, sunflower seed oil, as well as fully or partially hydrogenated derivatives and mixtures of these triglycerides. While the esterified alkoxylated polysaccharide may be combined in any proportion with the triglyceride lipid, weight ratios of from 5:95 to 95:5 are particularly advantageous. The triglyceride lipid may be selected so as to impart a desirable level of calories, flavor, aroma, mouth feel, thermal stability, viscosity, or other such property to the blend.

The fat substitute of this invention can replace a triglyceride lipid in a cooking oil, frying oil, salad oil, or shortening, for example. Additional uses include combining the esterified alkoxylated polysaccharide with other foodstuff ingredients to form food compositions such as frozen desserts (e.g., sherbert, ice cream, frozen yogurt, milk shakes), baked goods (cakes, doughnuts, muffins, brownies, breads, pies, rolls, pastries, cookies, biscuits, crackers), nut butters (peanut butter), dairy products (margarine, sour cream, coffee lighteners, cheese, cheese spreads, flavored dips, filled cream, filled milk), mayonnaise, salad dressing, savory snacks (potato chips, corn chips, cheese puffs, pretzels), fried foods (fried poultry, fritters, fried pies, fried vegetables such as french fried potatoes, fried fish), reformed and comminuted meats (lunch meats, sausage, hot dogs, hamburger), pet foods, meat and egg substitutes or extenders, whipped toppings, gravies and other sauces, frostings, fillings, icings, cocoa butter replacements or blends, candies (especially those normally containing fatty ingredients such as chocolate or peanut butter), soups, dry baking mixes (for muffins, cakes, pancakes, waffles, brownies, and the like) and the like. Owing to the fat-like properties and stability of the esterified alkoxylated polysaccharides, minimum reformulation of standard food compositions will generally be required.

Illustrative ingredients which may be used in combination with the fat mimetics of this invention include carbohydrates (starches, sugars, celluloses), edible lipids (triglycerides), proteins (from animal or vegetable sources), vitamins, antioxidants, emulsifiers, thickeners, preservatives, colorants, flavors, fragrances, sugar substitutes (saccharin, aspartame, sucralose, cyclamates, and the like), other fat substitutes or fat mimetics (for example, sucrose polyester, esterified propoxylated glycerin), water, milk, spices, eggs, and the like. The esterified alkoxylated polysaccharides of this invention are particularly suitable for the preparation of food compositions requiring exposure to elevated temperatures. Unlike other proposed fat substitutes such as proteinacous macrocolloids or certain polysaccharide-based substances requiring water to render them fat-like in texture, the fat mimetics of this invention are exceptionally stable thermally and do not readily decompose or lose their fat-like properties when heated. The fat mimetics thus may readily be utilized in deep fat frying applications to prepare fried foods such as savory snacks, fried chicken, fried fish, french fries, and the like since they will function as effective heat transfer media (that is, they will transmit heat rapidly and uniformly to the food being fried and also provide crisping).

From the foregoing description, one skilled in the art can readily ascertain the essential characteristics of this invention and, without departing from the spirit and scope thereof, can make various changes and modifications of the invention to adapt it to various usages, conditions, and embodiments.

The following examples further illustrate the fat mimetics and food compositions of this invention, but are not limitative of the invention in any manner whatsoever.

EXAMPLES

Example 1

Preparation of Propoxylated Starch 500 parts of starch is added to a stainless steel pressure reactor followed by 500 mL of anhydrous toluene. 10 grams of 50% aqueous potassium hydroxide is then added and the mixture heated to reflux. After removal of the water as a toluene azeotrope, the reactor is sealed and heated to 110° C. Propylene oxide (PO) is added on a pressure demand basis to maintain a temperature of 100°-120° C. and a pressure of approx. 50 psi. After 1790 parts of propylene oxide is added (representing approximately 3.3 equivalents of epoxide per equivalent of hydroxyl in the starch), the mixture is heated for another 8 hours, vented and purged with nitrogen. 20 parts of magnesium silicate (Magnesol) are then added to remove the catalyst and the mixture is heated for another hour at 90° C. before filtering at 70°-80° C. and removing the solvent. The product is expected to be a viscous liquid weighing approx. 2290 parts with a viscosity of approx. 5000-8000 cps and a hydroxyl number of approx. 227 mg KOH/g.

Example 2

Preparation of Esterified Propoxylated Starch by Esterification With Fatty Acids 500 parts of the propoxylated starch from Example 1 is added to a stainless steel reactor equipped with vacuum adapter and overhead condensate trap. 1200 parts of oleic acid is added and the mixture heated under vacuum to 240° C. for 10 hours. Excess acid is removed by vacuum steam distillation at 1 torr pressure with 5% steam added per hour. 1034 parts of the final ester is expected as a viscous liquid with an ester conversion of >98% and an acid number of 1.0 mg KOH/g with essentially the same appearance, odor, and taste of refined vegetable oil.

Example 3

Preparation of Esterified Propoxylated Starch by Transesterification with Methyl Fatty Esters 500 parts of the propoxylated starch from Example 1 is added to a stainless steel reactor equipped with vacuum adapter and overhead condensate trap. 720 parts of methyl oleate is added followed by 8.5 parts of sodium methylate. The reactor is sealed and the mixture heated under vacuum to 150° C. for 5 hours. Excess methyl esters are then removed by vacuum steam distillation at 1 torr pressure with 5% steam added per hour. 1034 parts of the final ester is expected as a viscous liquid with an ester conversion of >98% and an acid number of less than 0.2 mg KOH/g with the appearance, odor, and taste of refined vegetable oil.

Example 4

Preparation of EO/PO Block Alkoxylated Starch 500 parts of starch is added to a stainless steel pressure reactor followed by 500 mL of anhydrous toluene. 10 grams of 50% aqueous potassium hydroxide is then added and the mixture heated to reflux. After removal of the water as the toluene azeotrope, the reactor is sealed and heated to 100° C. Ethylene oxide (EO) is added on a pressure demand basis to maintain a temperature of 100-120 and a pressure of approx. 80 psi. After 900 parts of ethylene oxide is added the feed stream is switched to propylene oxide and another 900 parts added at the same temperature. After the addition the mixture is heated for another 8 hours, vented and purged with nitrogen. 20 parts of magnesium silicate (Magnesol) are then added and the mixture is heated for another hour at 90° C. before filtering at 70°-80° C. and removing the solvent. The product should be a viscous liquid weighing approx. 2300 part with a viscosity of approx. 5000-8000 cps and a hydroxyl number of approx. 226 mg KOH/g.

Example 5

Preparation of EO/PO Random Alkoxylated Starch

The procedure from Example 1 is followed except that 1800 parts of a 50/50 (w/w) mixture of EO and PO are used for the alkoxylation. The product is expected to be essentially identical in weight, appearance, and analysis to the product in Example 4.

Example 6

Preparation of Block Alkoxylated Starch Fatty Ester

The procedure from Example 3 was followed using 710 parts of methyl oleate and 500 parts of the block alkoxylated starch from Example 4. The product is expected to be 1032 parts of a viscous liquid with essentially the same appearance and properties of refined vegetable oil. However, it is expected that the product should increase in viscosity upon absorption of water and that oil leakage will therefore be reduced.

Example 7

Preparation of Random Alkoxylated Starch Fatty Ester

The procedure from Example 3 was followed using 710 parts of methyl oleate and 500 parts of the random EO/PO alkoxylated starch from Example 5. The product is expected to be 1032 parts of a viscous liquid with essentially the same appearance and properties of the other esters but as in Example 6, it is expected that the product should increase in viscosity upon absorption of water and therefore has the potential for reducing oil leakage.

Example 8

Preparation of Low Molecular Weight Propoxylated Starch 500 parts of starch is added to a stainless steel pressure reactor followed by 500 mL of anhydrous toluene. 5 grams of 50% aqueous potassium hydroxide is then added and the mixture heated to reflux. After removal of the water as the toluene azeotrope, the reactor is sealed and heated to 110° C. Propylene oxide is added on a pressure demand basis to maintain a temperature of 100-120 and a pressure of approx. 50 psi. After 300 parts of propylene oxide is added the mixture is heated for another 8 hours, vented and purged with nitrogen. 10 parts of magnesium silicate (Magnesol) are then added and the mixture is heated for another hours at 90° C. before filtering at 70°-80° C. and removing the solvent. The product should be an amorphous solid weighing approx. 800 parts and a hydroxyl number of approx. 650 mg KOH/g.

Example 9

Preparation of Propoxylated Starch Fatty Ester from Soybean Fatty Acids with High Solid Content The procedure from Example 3 was followed using 2100 parts of soybean fatty acid methyl ester and 500 parts of the low molecular weight propoxylated starch from Example 8. The product is expected to have the essential characteristics of refined soybean oil.

Example 10

Preparation of Medium Molecular Weight Propoxylated Starch 500 parts of starch is added to a stainless steel pressure reactor followed by 500 parts of anhydrous toluene. Five parts of 50% aqueous potassium hydroxide is then added and the mixture heated to reflux. After removal of the water as the toluene azeotrope, the reactor is sealed and heated to 110° C. Propylene oxide is added on a pressure demand basis to maintain a temperature of 100°-120° C. and a pressure of approx. 50 psi. After 550 parts of propylene oxide is added, the mixture is heated for another 8 hours, vented and purged with nitrogen. 10 parts of magnesium silicate (Magnesol) are then added and the mixture is heated for another hour at 90° C. before filtering at 70°-80° C. and removing the solvent. The product can be expected to be a thick gel-like solid weighing approx. 1050 parts with a hydroxyl number of approx. 495 mg KOH/g.

Example 11

Preparation of Partially Esterified Propoxylated Starch Esters

The procedure from Example 3 was followed using 1623 parts of soybean fatty acid methyl ester and 500 parts of the medium molecular weight propoxylated starch from Example 10. The product should weigh 1250 parts and could be expected to have emulsification, thixotropic, or gelling properties that would reduce oil leakage.

Example 12

Preparation of Partially Esterified Propoxylated Starch Esters

The procedure from Example 3 was followed using 250 parts of soybean fatty acid methyl esters and 500 parts of the block EO/PO alkoxylated starch from Example 6. As in Example 11, the product could be expected to have emulsification, thixotropic, or gelling properties that would reduce oil leakage.

Example 13

Preparation of Reduced Calorie French Fries

This example demonstrates the preparation of reduced calorie french fries using the esterified alkoxylated polysaccharide of this invention.

Potatoes are pared and then cut lengthwise in strips approximately ⅜ inch in width. The esterified alkoxylated polysaccharide of Example 2 is heated to 360° F. in a suitable deep-fat cooking vessel; sufficient esterified alkoxylated polysaccharide is employed to provide a layer at least about 2 inches deep in the vessel. The cut potato strips are then placed in the hot block copolymer for 6 to 7 minutes or until crisp and golden. Drain on paper towels and sprinkle with salt.

The french fries thus prepared are expected to be similar in taste, odor, and appearance to french fries prepared using a conventional triglyceride oil. However, their available caloric content is significantly reduced owing to the pronounced resistance of the esterified alkoxylated polysaccharide towards digestion and absorption.

Example 14

Preparation of a Carrot-Pineapple Cake

The preparation of a carrot-pineapple cake using the esterified alkoxylated polysaccharide of this invention is illustrated by this example.

Sifted all-purpose flour (1½ cups), sugar (1 cup), baking powder (1 tsp.), baking soda (1 tsp.), ground cinnamon (1 tsp.), and salt (¼ tsp.) are sifted together in a bowl. The esterified alkoxylated polysaccharide of Example 3 (⅔ cup), eggs (2), finely shredded carrot (1 cup), crushed pineapple with syrup (½ cup), and vanilla (1 tsp.) are then added and mixed until moistened. The mixture is beaten 2 minutes at medium speed using an electric mixer, placed in a greased and floured 9×9×2 inch pan, and baked at 350° F. for 35 minutes or until done. Cool 10 minutes and remove from pan. The cake thus prepared is expected to be similar in taste, odor, appearance, and texture to a cake prepared using soybean oil instead of the esterified alkoxylated polysaccharide, yet is substantially lower in available calorie content due to the hydrolysis- and absorption-resistance of the fat mimetic.

Example 15

Preparation of Propoxylated Cellulose

Hydrolyzed wood pulp cellulose (100 parts) having an average molecular weight of about 75,000 (approx. 460 anhydroglucose units), anhydrous toluene (250 parts), and 50% aqueous potassium hydroxide (5 parts) are combined in a stainless steel pressure vessel equipped with a mechanical agitator. The mixture is heated to reflux and residual water is removed as a toluene azeotrope, with the recovered toluene being recycled to the vessel. The vessel is purged with nitrogen, sealed, and heated to 110° C. Propylene oxide (1075 parts) is added on a pressure demand basis while maintaining the temperature at 110° C. and a pressure of approximately 75 psi. After completion of the propylene oxide addition, the reaction mixture is stirred at 120° C. for another 12 hours. The vessel is cooled to about 40° C., vented, and purged with nitrogen. Magnesium silicate (20 parts) is then added and the mixture heated for another 4 hours at 100° C. before filtering (70°-80° C.) and removing the solvent. The product is expected to be a propoxylated cellulose containing an average of 10 oxypropylene units per hydroxyl group in the starting cellulose (that is, the average degree of alkoxylation per anhydroglucose unit is about 30).

Example 16

Preparation of Esterified Propoxylated Cellulose

The propoxylated cellulose product of Example 15 is mixed with a 20% molar excess (based on the hydroxyl content of the propoxylated cellulose) of coconut fatty acids (Emery 621 grade, available from the Emery Group of Henkel Corp.) and heated at 240° C. under a nitrogen purge to remove the water generated. After obtaining a hydroxyl conversion of greater than 95%, the product is diluted with hexane, treated with aqueous potassium hydroxide to neutralize the excess unreacted fatty acid, and filtered to remove the precipitated fatty acid salt. After removing the solvent by vacuum distillation, the fatty acid salt level is reduced further by heating with magnesium silicate at 90° C. for 2 hours and filtering. The product obtained is an esterified propoxylated cellulose useable as a fat substitute in the preparation of reduced calorie food compositions.

Example 17

Preparation of Propoxylated/Butoxylated Starch

To 100 parts 80-fluidity corn starch in a reaction vessel is added 100 parts xylene and 4.5 parts potassium hydroxide (as a 50% aqueous solution). The reaction vessel is heated to reflux and water removed as an xylene azeotrope, with the recovered xylene being recycled to the vessel. When water evolution ceases, a mixture of propylene oxide (215 parts) and 1,2-butylene oxide (133.2 parts) is added on a pressure demand basis, while maintaining a reaction temperature of 110° C. and an autogenous pressure of no more than about 80 psig. After addition is completed, heating is continued until esentially quantitative (that is, >99%) conversion of the epoxide is achieved. The reaction product is purified in the same manner as described in previous examples to yield an alkoxylated starch having an average degree of alkoxylation of about 9 (that is, each anhydroglucose unit is substituted with about 9 oxyalkylene units on average). The molar ratio of oxypropylene units to oxybutylene

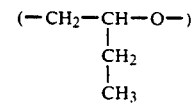

units in the polyoxyalkylene segments of the product is about 2:1. On average, the product contains about 250 anhydroglucose units.

Example 18

Preparation of Esterified Propoxylated/Butoxylated Starch

The procedure of Example 2 is repeated using the propoxylated/butoxylated starch from Example 17 (500 parts) and a 25% molar excess (based on the hydroxyl content of the propoxylated/butoxylated starch) of corn oil fatty acids (predominately a mixture of linoleic acid, oleic acid, stearic acid, and palmitic acid). The product obtained is an esterified propoxylated/butoxylated starch useful as a fat mimetic in the preparation of reduced calorie food compositions.

I claim:

1. A reduced calorie food composition comprising at least one non-fat foodstuff ingredient and a fat-type component wherein at least a portion of the fat-type component is an esterified alkoxylated polysaccharide having at least 10 anhydromonosaccharide units, a plurality of oxyalkylene units derived from at least one unsymmetrically substituted $C_3$-$C_{10}$ epoxide covalently bonded to the anhydromonosaccharide units through ether linkages, and a plurality of acyl groups derived from at least one $C_8$-$C_{24}$ fatty acid covalently bonded to the oxyalkylene units through ester linkages, wherein the anhydromonosaccharide units have an average degree of alkoxylation of from 5 to 60.

2. The reduced calorie food composition of claim 1 wherein the anhydromonosaccharide units are selected from the group consisting of anhydroglucose units, anhydrofructose units, anhydrogalactose units, anhydromannose units, anhydroxylose units, anhydroarabinose units, anhydroglucosamine units, anhydrogalactosamine units, anhydroglucuronic acid units, and anhydroarabinose units.

3. The reduced calorie food composition of claim 1 wherein the oxyalkylene units have the general structure

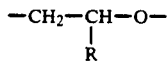

wherein R is a $C_1$-$C_6$ alkyl group.

4. The reduced calorie food composition of claim 1 wherein the $C_8$-$C_{24}$ fatty acid is selected from the group consisting of caprylic, capric, lauric, myristic, myristoleic, stearic, palmitic, palmitoleic, rincinoleic, linoleic, linolenic, elaeostearic, arachidic, arachidonic, behenic, erucic, oleic, and heptadecanoic acid.

5. The reduced calorie food composition of claim 1 wherein the number of anhydromonosaccharide units is from 10 to 10,000.

6. The reduced calorie food composition of claim 1 wherein the anhydromonosaccharide units have an average degree of esterification of from 0.5 to 3.

7. A reduced calorie food composition comprising at least one non-fat foodstuff ingredient and a fat-type component wherein at least a portion of the fat-type component is an esterified alkoxylated polysaccharide having at least 10 anhydromonosaccharide units, wherein the majority of the anhydromonosaccharide units each have attached thereto through an ether linkage from 1 to 3 pendent polyoxyalkylene segments having the structure

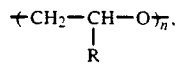

wherein n is an integer of from 1 to 20 and R is a $C_1$-$C_6$ alkyl group, wherein the anhydromonosaccharide units have an average degree of alkoxylation of from 5 to 60, and wherein the majority of the polyoxyalkylene segments are attached through an ester linkage to an acyl group derived from a $C_8$-$C_{24}$ fatty acid.

8. The reduced calorie food composition of claim 7 wherein at least about 75% of the anhydromonosaccharide units are anhydromonoglucose units.

9. The reduced calorie food composition of claim 7 wherein R is methyl or ethyl.

10. The reduced calorie food composition of claim 7 wherein the $C_8$-$C_{24}$ fatty acid is selected from the group consisting of caprylic, capric, lauric, myristic, myristoleic, stearic, palmitic, palmitoleic, rincinoleic, linoleic, linolenic, elaeostearic, arachidic, arachidonic, behenic, erucic, oleic, and heptadecanoic acid.

11. A reduced calorie food composition comprising at least one non-fat foodstuff ingredient and a fat-type component wherein at least a portion of the fat-type component is an esterified alkoxylated polysaccharide having at least 10 anhydromonosaccharide units having oxyalkylene groups derived from at least one unsymmetrically substituted $C_3$-$C_{10}$ epoxide pendent thereto, an average degree of alkoxylation of at least 5, and an average degree of esterification of at least 1.5 wherein the ester groups are derived from at least one $C_8$-$C_{24}$ fatty acid.

12. The reduced calorie food composition of claim 11 wherein at least about 90% of the anhydromonosaccharide units are anhydroglucose units.

13. The reduced calorie food composition of claim 11 wherein the oxyalkylene groups have the general structure

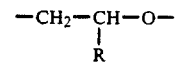

wherein R is a $C_1$-$C_6$ alkyl group.

14. The reduced calorie food composition of claim 11 wherein the $C_8$-$C_{24}$ fatty acid is selected from the group consisting of caprylic, capric, lauric, myristic, myristoleic, stearic, palmitic, palmitoleic, rincinoleic, linoleic, linolenic, elaeostearic, arachidic, arachidonic, behenic, erucic, oleic, and heptadecanoic acid.

15. A reduced calorie food composition comprising at least one non-fat foodstuff ingredient and a fat-type component wherein at least about 10 weight percent of the fat-type component is an esterified propoxylated polysaccharide comprised of n structural repeating units of the general formula

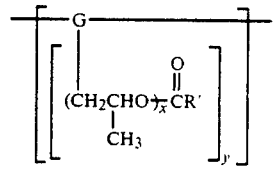

wherein n is at least 10, G is an anhydroglucose unit, x is from 2 to 20, y is an integer of from 1 to 3, the anhydromonosaccharide units have an average degree of alkoxylation of from 5 to 60, and

is an acyl group derived from a $C_8$-$C_{24}$ fatty acid.

16. The reduced calorie food composition of claim 15 wherein the $C_8$-$C_{24}$ fatty acid is a fatty acid selected from the group consisting of caprylic, capric, lauric, myristic, myristoleic, stearic, palmitic, palmitoleic, rincinoleic, linoleic, linolenic, elaeostearic, arachidic, arachidonic, behenic, erucic, oleic, and heptadecanoic acid.

17. A reduced calorie food composition comprising at least one non-fat foodstuff ingredient and a fat-type component wherein at least a portion of the fat-type component is an esterified alkoxylated polysaccharide comprising the reaction product obtained by alkoxylating a polysaccharide having at least 10 anhydromonosaccharide units with at least one unsymmetrically substituted $C_3$-$C_{10}$ epoxide to form an alkoxylated polysaccharide wherein the anhydromonosaccharide units have an average degree of alkoxylation of from 5 to 60 and esterifying the alkoxylated polysaccharide with at least one $C_8$-$C_{24}$ fatty acid or fatty acid equivalent.

18. The reduced calorie food composition of claim 17 wherein the polysaccharide is selected from the group consisting of starch, cellulose, glycogen, fructan, xanthan gum, polydextrose, arabinogalactan, carrageenan, hemicellulose, inulin, xylan, mannan, gum arabic, dextrin, chitin, and partially hydrolyzed derivatives thereof.

19. The reduced calorie food composition of claim 17 wherein the epoxide has the general structure

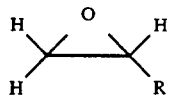

wherein R is a $C_1-C_6$ alkyl group.

20. A reduced calorie food composition comprising at least one non-fat foodstuff ingredient and a fat-type component wherein at least about 10 weight percent of the fat-type component is an esterified propoxylated polysaccharide comprising the reaction product obtained by propoxylating a polysaccharide having at least 10 anhydroglucose units with from 5 to 60 equivalents of propylene oxide per anhydroglucose unit to form a propoxylated polysaccharide and esterifying the propoxylated polysaccharide with from 0.5 to 3 equivalents of at least one $C_8-C_{24}$ fatty acid or fatty acid equivalent per anhydroglucose unit.

21. A fat-type composition suitable for use in the preparation of a reduced calorie food composition, said fat-type composition comprising a) an edible fatty acid triglyceride and b) an esterified alkoxylated polysaccharide having at least 10 anhydromonosaccharide units, a plurality of oxyalkylene units derived from at least one unsymmetrically substituted $C_3-C_{10}$ epoxide covalently bonded to the anhydromonosaccharide units through ether linkages, and a plurality of acyl groups derived from at least one $C_8-C_{24}$ fatty acid covalently bonded to the oxyalkylene units through ester linkages, wherein the anhydromonosaccharide units have an average degree of alkoxylation of from 5 to 60.

22. The fat-type composition of claim 21 wherein the edible fatty acid triglyceride is selected from the group consisting of tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, and hydrogenated derivatives thereof.

23. A fat-like composition suitable for use in the preparation of a reduced calorie food composition, said fat like composition comprising a) an edible fatty acid triglyceride and b) an esterified alkoxylated polysaccharide having at least 10 anhydromonosaccharide units, the anhydromonosaccharide units having oxyalkylene groups derived from at least one unsymmetrically substituted $C_3-C_{10}$ epoxide pendent thereto, an average degree of alkoxylation of at least about 5, and an average degree of esterification of at least about 1.5 wherein the ester groups are derived from at least one $C_8-C_{24}$ fatty acid.

24. A method of reducing the available caloric content of a food composition comprised of a conventional edible fatty acid triglyceride, said method comprising replacing at least a portion of the conventional edible fatty acid triglyceride with an esterified alkoxylated polysaccharide having at least 10 anhydromonosaccharide units through ether linkages, a plurality of oxyalkylene units derived from at least one unsymmetrically substituted $C_3-C_{10}$ epoxide covalently bonded to the anhydromonosaccharide units, and a plurality of acyl groups derived from at least one $C_8-C_{24}$ fatty acid covalently bonded to the oxyalkylene units through ester linkages, wherein the anhydromonosaccharide units have an average degree of alkoxylation of from 5 to 60.

25. A method of reducing the available caloric content of a food composition comprised of a conventional edible fatty acid triglyceride, said method comprising replacing at least a portion of the conventional edible fatty acid triglyceride with an esterified alkoxylated polysaccharide having at least 10 anhydromonosaccharide units, the anhydromonosaccharide units having oxyalkylene groups derived from an unsymmetrically substituted $C_3-C_{10}$ epoxide pendent thereto, an average degree of alkoxylation of at least about 5, and an average degree of esterification of at least about 1.5 wherein the ester groups are derived from at least one $C_8-C_{24}$ fatty acid.

* * * * *